US005305777A

United States Patent [19]

Nakamura et al.

[11] Patent Number: 5,305,777

[45] Date of Patent: Apr. 26, 1994

[54] SPEED CONTROLLER

[75] Inventors: Sanae Nakamura; Shizuo Mori, both of Ibaraki, Japan

[73] Assignee: SMC Kabushiki Kaisha, Tokyo, Japan

[21] Appl. No.: 71,230

[22] Filed: Jun. 4, 1993

Related U.S. Application Data

[63] Continuation of Ser. No. 898,099, Jun. 12, 1993, abandoned.

[30] Foreign Application Priority Data

Jun. 24, 1991 [JP] Japan .................................. 3-152059
Dec. 19, 1991 [JP] Japan .................................. 3-337093

[51] Int. Cl.[5] .............................................. F16K 11/02
[52] U.S. Cl. .................................................... 137/102
[58] Field of Search ..................... 137/102, 107, 513.3

[56] References Cited

U.S. PATENT DOCUMENTS 2,270,549 1/1942 Orr .
2,610,859 9/1952 Wilcox et al. .
3,851,658 12/1974 Bunyard ............................. 137/102
3,895,648 7/1975 Stoll ............................... 137/102 X
4,619,287 10/1986 Hama .............................. 137/513.3

FOREIGN PATENT DOCUMENTS 0449768 2/1991 European Pat. Off. .
1175046 7/1964 Fed. Rep. of Germany .
2524552 10/1976 Fed. Rep. of Germany .
3739981 6/1988 Fed. Rep. of Germany .
3911866 8/1990 Fed. Rep. of Germany .
2214075 8/1974 France .
2352188 12/1977 France .

OTHER PUBLICATIONS

Art cited in Taiwanese Application. Date unknown. (undated).

*Primary Examiner*—Robert G. Nilson
*Attorney, Agent, or Firm*—Oblon, Spivak, McClelland, Maier & Neustadt

[57] ABSTRACT

Disclosed herein is a speed controller of a type wherein a check valve flexed depending on the flow direction of a pressurized fluid can be seated on a seat portion of a main body thereof and separated therefrom. The main body has first and second connecting portions capable of communicating with a pressurized-fluid flow channel defined in a pressurized fluid device. A needle valve mechanism is provided in continuation with a passage defined in the main body. When the pressurized fluid is introduced from the first connecting portion, the check valve is tightly fitted on a seat portion formed in the main body so as to close the passage and the second connecting portion. On the other hand, when the pressurized fluid is introduced from the second connecting portion, the check valve is separated from the seat portion so as to close the first and second connecting portions and discharge the pressurized fluid introduced from the second connecting portion into the needle valve mechanism via the passage. Therefore, water vapor can be prevented from adhering to the pressurized-fluid flow channel for allowing an electromagnetic valve to communicate with a cylinder. The response time of the cylinder can be shortened as a whole and the degree of freedom of arrangement of devices can be improved.

20 Claims, 8 Drawing Sheets

SPEED CONTROLLER

This application is a continuation of application Ser. No. 07,898,099, filed on Jun. 12, 1993, now abandoned.

BACKGROUND OF THE INVENTION

1. Field of the Invention

The present invention relates to a speed controller, and more specifically to a speed controller of a type wherein a check valve displaced according to the flow direction of a pressurized fluid is disposed so as to be seated on a seat portion of a main body thereof and separated from the seat portion.

2. Description of the Related Art

Heretofore, there have widely been used pneumatic devices to drive and control objects using a pressurized fluid such as pressurized air. One of the pneumatic devices, e.g., a cylinder is normally provided with a plurality of ports to introduce the pressurized air therein and discharge it therefrom. In general, the pressurized air is introduced into these ports by a speed controller. A piston provided inside the cylinder is reciprocated at a given speed by the introduced pressurized air. In this case, a method of increasing effective cross sections of respective parts, which are exposed to the pressurized air, of a line, an electromagnetic valve and the speed controller coupled to the cylinder to thereby reduce the resistance to the pressurized air and smoothly circulating the pressurized air is effective in reciprocating the piston at a high speed, i.e., reducing the response time of the cylinder and improving the efficiency of work.

However, when the effective cross sections of the electromagnetic valve, etc. are increased, the dimensions of the respective devices increase correspondingly and the positions at which they are disposed are restricted. In particular, such devices are normally disposed adjacent to one another in order to effectively use narrow spaces. Therefore, they may preferably be formed as small as possible. When the pressurized air flows out from the electromagnetic valve, water or moisture included in the air is cooled by adiabatic expansion so as to change into water vapor, which in turn adheres to the inside of a tube or line. When the cylinder is actuated in the next step, the water vapor is brought into the cylinder by the pressurized air, so that the water or moisture gradually remains in the cylinder.

SUMMARY OF THE INVENTION

It is a principal object of the present invention to provide a speed controller capable of being designed in small size, improving the degree of freedom of arrangement of devices, reducing the response time of a cylinder and discharging pressurized air in the cylinder from the speed controller so as to prevent moisture developed upon discharge of the pressurized air from the speed controller from adhering to the inside of a line.

It is another object of the present invention to provide a speed controller comprising a main body having first and second connecting portions capable of communicating with a pressurized-fluid flow channel defined in a pressurized fluid device, a needle valve mechanism provided in continuation with a passage defined in the main body, and a check valve being tightly fitted on a seat portion formed in the main body when a pressurized fluid is introduced from the first connecting portion to thereby close the passage and the second connecting portion, whereas the check valve being separated from the seat portion when the pressurized fluid is introduced from the second connecting portion to thereby close the first and second connecting portions and discharge the pressurized fluid introduced from the second connecting portion into the needle valve mechanism via the passage.

It is a further object of the present invention to provide a speed controller wherein the needle valve mechanism has a silencing member for eliminating noise developed in the pressurized fluid discharged under the control of the flow rate of the pressurized fluid.

It is a still further object of the present invention to provide a speed controller wherein the first connecting portion is provided coaxially with the needle valve mechanism and the axis of the second connecting portion meets at a right angle with the axis of the first connecting portion.

It is a still further object of the present invention to provide a speed controller wherein the second connecting portion is provided coaxially with the needle valve mechanism and the axis of the first connecting portion meets at a right angle with the axis of the second connecting portion.

It is a still further object of the present invention to provide a speed controller wherein the check valve has a valve portion seated on the seat portion formed in the main body and a flexible lip brought into sliding contact with the inner wall surface of the main body when the pressurized fluid is introduced from the second connecting portion of the main body.

It is a still further object of the present invention to provide a speed controller wherein the main body has a first seat portion for opening and closing the first and second connecting portions and a second seat portion for opening and closing both the passage which communicates with the needle valve mechanism and the second connecting portion, and the check valve is disposed movably along its axis so as to be seated on the first and second seat portions.

It is a still further object of the present invention to provide a speed controller further comprising a cylindrical body coaxially provided within the main body and a ring-shaped check valve slidably and externally fitted on the outer peripheral wall of the cylindrical body, the cylindrical body including first and second seat portions, a passage which communicates with the needle valve mechanism, and an opening for causing the passage to communicate with the second connecting portion when the ring-shaped check valve is seated on the first seat portion and for closing the passage when the ring-shaped check valve is seated on the seat portion.

It is a still further object of the present invention to provide a speed controller wherein the main body has a receiving member formed therein, which includes a first seat portion on which a valve portion of the check valve is seated and a slanted hole in which a lip of the check valve is fitted.

It is a still further object of the present invention to provide a speed controller wherein the main body has a fixed check valve disposed therein, which includes a flexible lip being tightly fitted on a seat portion of the main body when a pressurized fluid is introduced from a first connecting portion to thereby close a passage defined in the main body and a second connecting portion, whereas the flexible lip being separated from the seat portion and held in abutment against the inner wall surface of the main body when the pressurized fluid is introduced from the second connecting portion to thereby close the first and second connecting portions.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 1:
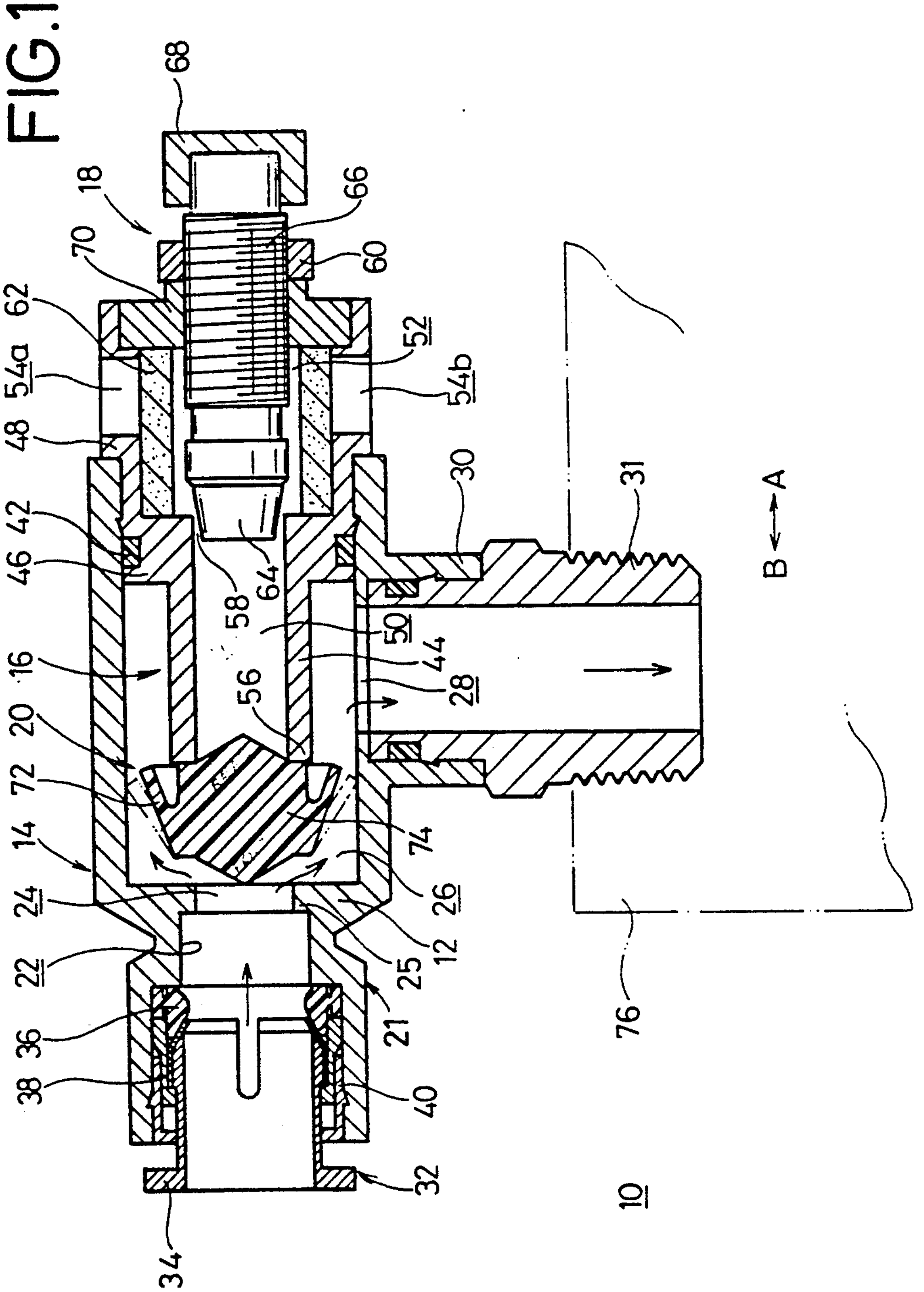
FIG. 1 is a vertical cross-sectional view showing a speed controller according to a first embodiment of the present invention.
Figure 2:
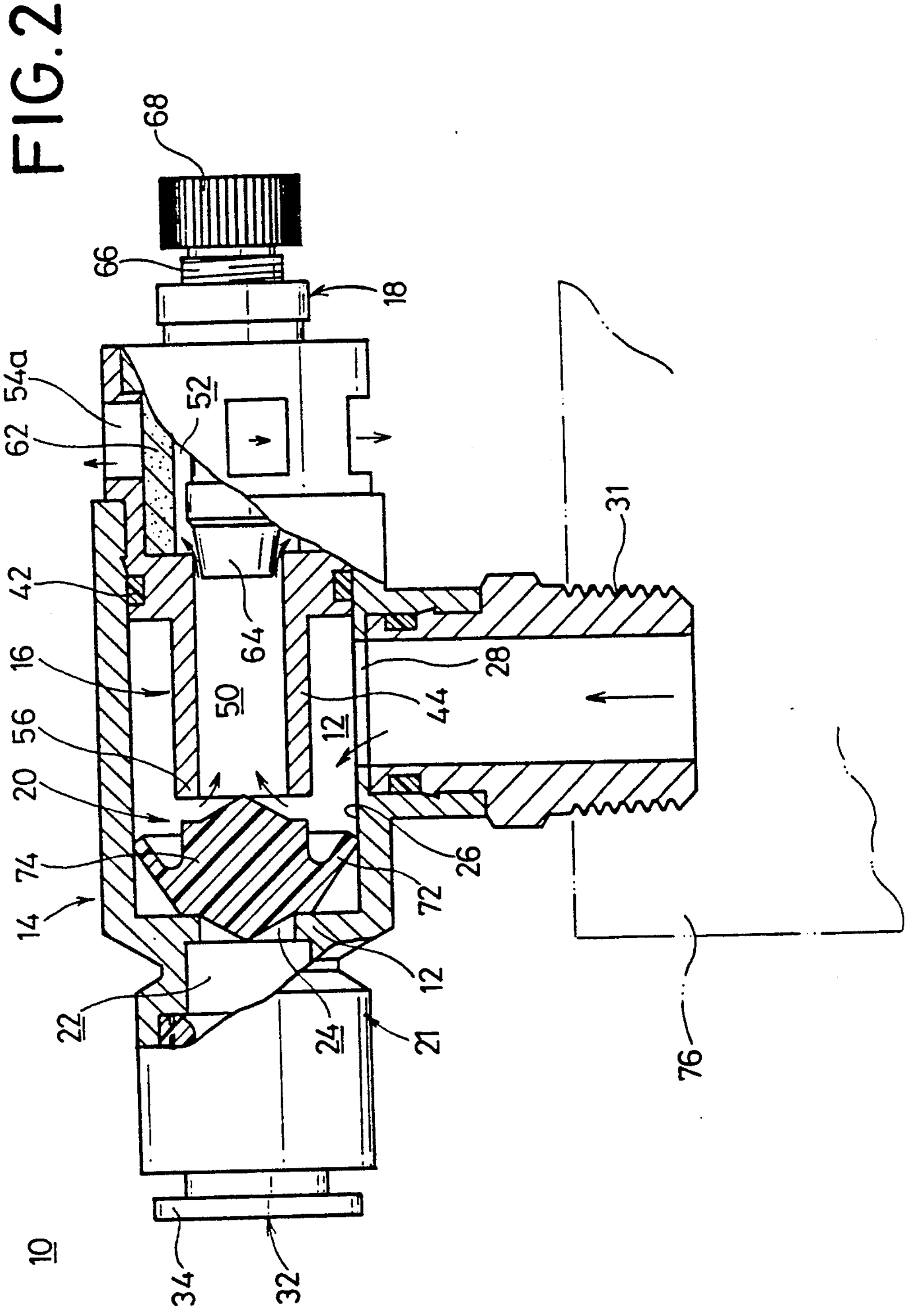
FIG. 2 is a vertical cross-sectional view showing the speed controller from which a pressurized fluid is discharged.

Referring now FIGS. 1 and 2, reference numeral 10 indicates a speed controller according to a first embodiment of the present invention. The speed controller 10 basically comprises a tube or line fitting 14, a cylindrical body 16 integraly fitted in the line fitting 14 and having a step like portion 46, a main body 18 of a needle valve, which is inserted into the cylindrical body 16, and a check valve 20 held in engagement with the leading end of the cylindrical body 16.

The line fitting 14 is shaped in the form of a cylinder whose both ends are opened. A first hole 22 serving as an aperture or opening through which a pressurized fluid flows, is defined in one (first connecting portion) of the ends of the line fitting 14. The inner end of the first hole 22 communicates with a third hole 26 via a second hole 24 whose diameter is narrow. A first seat portion 12 is formed by an annular protrusion 25 having the second hole 24 defined therein. A fourth hole 28, which communicates with the third hole 26, is defined in the outer peripheral wall of the line fitting 14. An annular wall portion (second connecting portion) 30, which encloses the fourth hole 28 and extends outwardly, is formed in the same position as that where the fourth hole 28 is defined. A connecting member 31 is fitted in the annular wall portion 30.

A so-called one-touch type fitting or joint 32 is inserted in the first hole 22. The one-touch type joint 32 comprises a release bush 34 having a plurality of cutaway portions defined in the bottom thereof, a chuck 38 formed of a metal plate which is shaped in the form of a ring and provided on the outer peripheral wall of the release bush 34, a collet 40 made of a synthetic resin, and a seal 36 formed of an elastic member such as natural rubber or synthetic rubber.

The cylindrical body 16 is inserted into the third hole 26 defined in the line fitting 14 from an open end of the third hole 26. A seal ring 42 is interposed between the inner peripheral wall of the line fitting 14 and the outer peripheral wall of the cylindrical body 16. The cylindrical body 16 has a first cylindrical portion 44 which is small in diameter and integrally coupled via a steplike portion 46 to a second cylindrical portion 48 whose diameter is large. The first cylindrical portion 44 has a first passage 50, which is defined therein along the axis thereof and has one end which communicates with a second passage 52 which is large in diameter. The second passage 52 is in communication with a plurality of third passages 54*a*, 54*b* which are oriented in the direction normal to the axis of the second passage 52 at a position near the end thereof. The end of the cylindrical body 16 having the first passage 50 defined therein is used as a second seat portion 56 for the check valve 20. Incidentally, reference numeral 58 indicates a valve portion used to define a narrow space defined between a valve leading end 64 of the main body 18 and the valve portion 58.

The main body 18 of the needle valve is enclosed by a silencing member 62 fixed to the steplike portion 46 of the cylindrical body 16, which is used to form the valve portion 58. A screw thread 66 is engraved on one end of the main body 18, whereas the valve leading end 64 shaped in the form of a taper is formed in the other end thereof. A control 68 is attached to one end of the screw thread 66. Incidentally, the silencing member 62 formed of a sintered metal, a palm lock or the like is held in abutment against a seal ring 70 fitted in the screw thread 66. The seal ring 70 is tightened by a lock nut 60.

The check valve 20 has a cross-section shaped in the form of an umbrella and includes a lip 72 and a valve body 74. The check valve 20 is formed of an elastic member such as natural rubber or synthetic rubber. In addition, the check valve 20 is disposed in the third hole 26 of the line fitting 14 and provided between the first seat portion 12 and the second seat portion 56 in such a manner as to be movable in the axial direction thereof. The outer peripheral wall of the lip 72 is brought into contact with the inner peripheral wall of the third hole 26. The valve body 74 has a cross-section shaped in the form of a trapezoid. In addition, the valve body 74 has a seat formed on one side and having a diameter larger than the internal diameter of the annular protrusion 25, and a seat formed on the other side and having a diameter substantially equal to the outer diameter of the second seat portion 56.

In FIG. 1, reference numeral 76 indicates a cylinder on which the speed controller 10 is fixedly mounted.

The speed controller 10 according to the present embodiment is constructed as described above. The operation of the speed controller 10 will now be described below.

First of all, a connecting pipe or line coupled to an unillustrated electromagnetic valve is previously inserted into the one-touch type joint 32 fitted in the first hole 22 of the speed controller 10 and the connecting member 31 is coupled to a port of the cylinder 76. Further, the control 68 is rotated to adjust the distance from the valve leading end 64 to the valve portion 58. Then, the electromagnetic valve is actuated to supply the pressurized fluid to the cylinder 76. Therefore, the pressurized fluid flows into the second hole 24 of the line fitting 14 from the onetouch type joint 32. Afterwards, the check valve 20 is displaced in the right-hand direction under the pressure of the pressurized fluid (see FIG. 1), so that the valve body 74 is tightly fitted on the second seat portion 56. At this time, the pressurized fluid flexes the lip 72 of the check valve 20 so as to separate the leading end of the lip 72 from the inner peripheral wall of the third hole 26, thereby causing the third hole 26 to communicate with a passage defined in the connecting member 31 (see FIG. 1). As a result, the pressurized fluid is introduced into the cylinder 76 via the fourth hole 28 so as to displace an unillustrated piston in the cylinder 76 in the direction indicated by the arrow A.

It is then necessary to discharge the pressurized fluid in the cylinder 76 when the piston is displaced in the direction indicated by the arrow B. At this time, the pressurized fluid travels from the passage of the connecting member 31 to the third hole 26 via the fourth hole 28, thereby displacing the check valve 20 tightly fitted on the second seat portion 56 of the cylindrical body 16 in the left-hand direction as seen in FIG. 2. Therefore, the seat formed in the valve body 74 is held in abutment against the annular protrusion 25 so as to close the first seat portion 12. On the other hand, the lip 72 of the check valve 20 is also pressed toward the inner peripheral wall of the third hole 26 by the pressurized fluid so as to increase the outer diameter of the check valve 20, thereby preventing the pressurized fluid to flow into the second hole 24 (see FIG. 2).

As a result, the check valve 20 is displaced toward the second hole 24 by the pressurized fluid to close the second hole 24 of the line fitting 14, thereby enabling the third hole 26 to communicate with the first passage 50. Thus, after the pressurized fluid in the third hole 26 has been introduced into the first passage 50, the pressurized fluid flows into the second passage 52 through the space defined between the valve portion 58 and the valve leading end 64 of the main body 18. When the pressurized fluid passes through the silencing member 62 disposed in the second passage 52, various noise developed in the pressurized fluid is eliminated. Afterwards, the pressurized fluid thus processed is discharged into the air or atmosphere from the third passages 54*a*, 54*b*.

Incidentally, the pressurized fluid, which flows into the unillustrated electromagnetic valve, the connecting line and the first hole 22 of the speed controller 10, is discharged into the air from a discharge hole defined in the electromagnetic valve.

According to the present embodiment, as described above, when the pressurized fluid is introduced into the cylinder 76 via the speed controller 10, the check valve 20 is tightly fitted on the second seat portion 56 of the cylindrical body 16 and the lip 72 is flexed. Thus, the respective pressurized-fluid introducing paths or passages defined between the unillustrated electromagnetic valve and the cylinder 76 communicate with one another. On the other hand, when the pressurized fluid is discharged from the cylinder 76, the check valve 20 is spaced away from the second seat portion 56 so as to be tightly fitted on the first seat portion 12, thereby closing the passage extending to the electromagnetic valve. Accordingly, the pressurized fluid passes through the first passage 50 defined in the second seat portion 56 and is then discharged into the air through the main body 18 of the needle valve. Therefore, the pressurized fluid in the cylinder 76 can be directly discharged into the air from the speed controller 10 without passing through the electromagnetic valve, thereby making it possible to reduce the response time of the cylinder 76. In addition, water vapor is not produced or emitted within the third hole 26 by adiabatic expansion, thus making it possible to prevent water or moisture from remaining in the cylinder 76.

Figure 3:
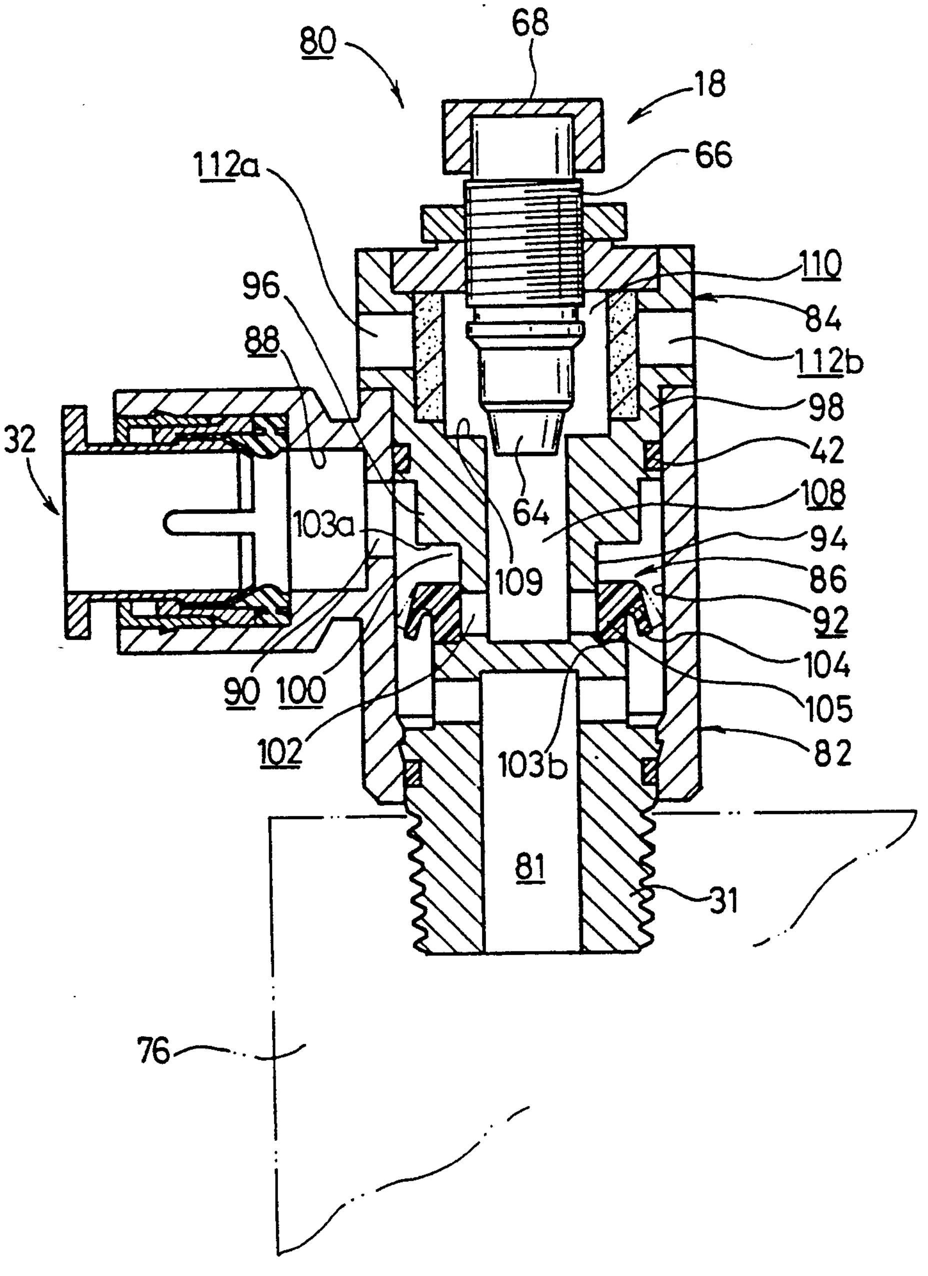
FIG. 3 is a vertical cross-sectional view illustrating a speed controller according to a second embodiment of the present invention.
Figure 4:
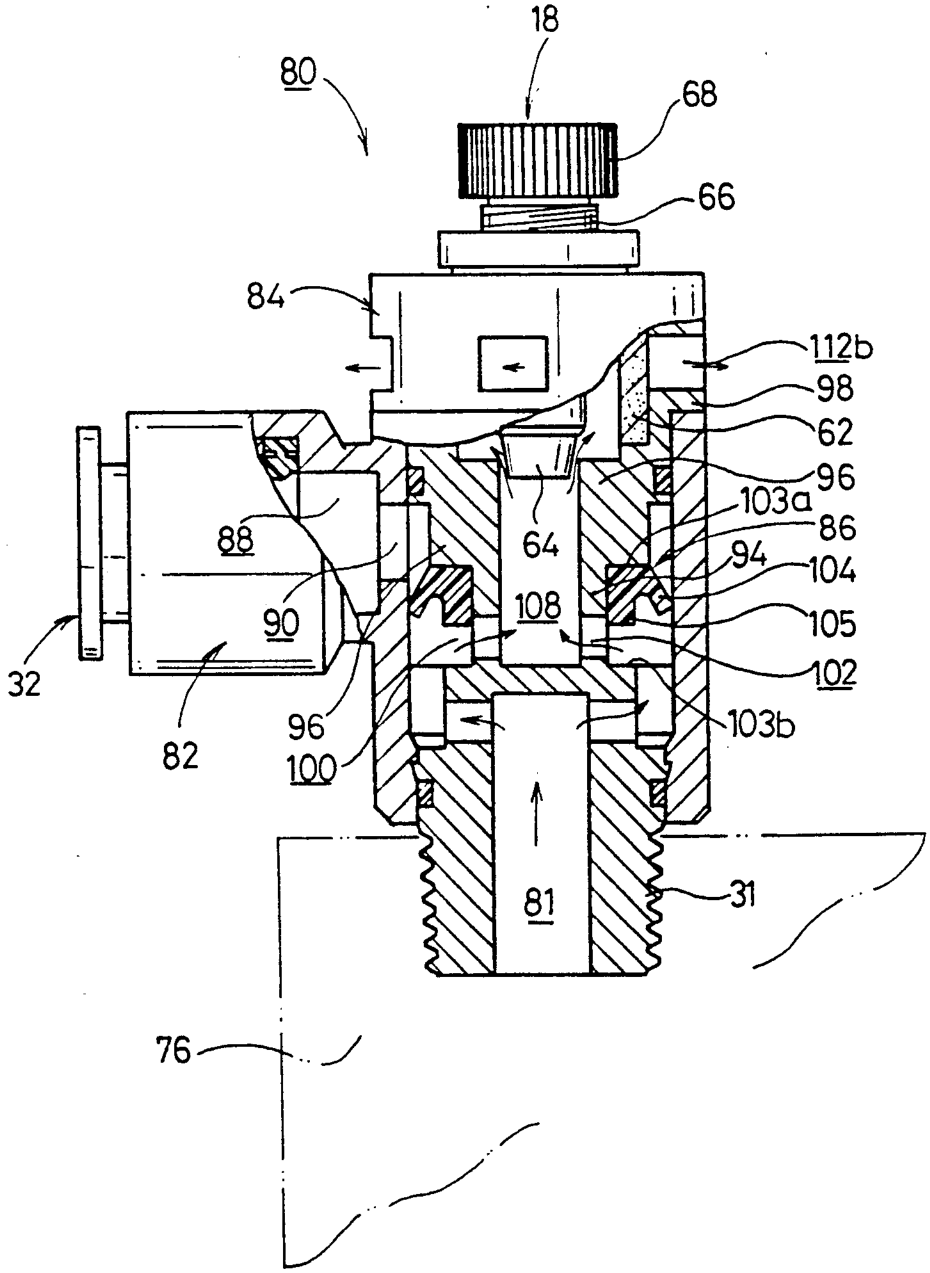
FIG. 4 is a vertical cross-sectional view depicting the speed controller shown in FIG. 3 from which a pressurized fluid is discharged.

FIGS. 3 and 4 show a second embodiment of the present invention. In the second embodiment, the same elements of structure as those employed in the first embodiment are identified by like reference numerals and their detailed description will therefore be omitted.

A speed controller 80 according to the second embodiment basically comprises a pipe or line fitting 82 having a pressurized-fluid flow channel, i.e., a pressurized-fluid introducing passage 81 defined therein, a cylindrical body 84 integrally fitted in the line fitting 82, a main body 18 of a needle valve, which is inserted into the cylindrical body 84, and a check valve 86 which can be displaced along the axis of the speed controller 80.

The line fitting 82 is of a substantially L-shaped cylindrical body and has a first hole 88 into which a one-touch type fitting or joint 32 is inserted, a second hole 90 having a small diameter, which communicates with the first hole 88, and a third hole 92 extending in the direction normal to the axis of the second hole 90, all of which are defined in the line fitting 82.

The cylindrical body 84 is inserted into the third hole 92 of the line fitting 82 via a seal ring 42. In addition, the cylindrical body 84 has a first cylindrical portion 94 which extends along the axis thereof and is small in diameter, and a second cylindrical portion 98 including a steplike portion 96, which overall diameter is large. The outer peripheral portion of the first cylindrical portion 94, which is of the smallest diameter, is used as a recess 100. The first cylindrical portion 94 has a first passage 102 which extends therethrough in such a manner as to be normal to the recess 100. A ring-shaped check valve 86 is movably fitted on the outer peripheral wall of the first cylindrical portion 94 in association with the recess 100. The check valve 86 can be seated on first and second seat portions 103*a*, 103*b*. A lip 104 of the check valve 86 is flexed outwardly and a valve portion 105 can close the first passage 102.

The first passage 102 communicates with a second passage 108 defined in the first cylindrical portion 94 of the cylindrical body 84 along the axis thereof. The end of the second passage 108 communicates with a third passage 110 having a large diameter, which is in turn in communication with a plurality of fourth passages 112*a*, 112*b* through a silencing member 62. A flat portion 109 of the cylindrical body 84 having the second passage 108 defined therein serves to define a narrow space between the valve leading end 64 of the main body 18 and the flat portion 109. That is, the flat portion 109 serves as a so-called diaphragm.

The operation of the speed controller 80 according to the second embodiment, which is constructed as described above, will now be described.

When an unillustrated electromagnetic valve is actuated to introduce the pressurized fluid into the third hole 92 from the one-touch type fitting 32 via the second hole 90, the check valve 86 slides downwardly along the recess 100 of the cylindrical body 84 so as to be seated on the second seat portion 103*b*. Accordingly, the valve portion 105 of the check valve 86 closes or blocks the first passage 102 which communicates with the recess 100, thereby cutting off the electromagnetic valve from communicating with the main body 18. On the other hand, the pressurized fluid flexes the lip 104 of the check valve 86 inwardly so as to reduce the outer diameter of the check valve 86, with the result that the pressurized fluid serves to cause the second hole 90 to communicate with the pressurized fluid introducing passage 81. That is, the pressurized fluid reaches a cylinder 76 via a connecting member 31 to thereby displace an unillustrated piston of the cylinder 76 in a desired direction (see FIG. 3).

When the pressurized fluid is then discharged from the cylinder 76, the pressurized fluid reaches the lip 104 of the check valve 86 from a passage defined in the connecting member 31 so as to outwardly flex the lip 104, thereby increasing the outer diameter of the check valve 86. As a result, the check valve 86 is displaced toward an upward position in the recess 100. Therefore, the check valve 86 is seated on the first seat portion 103*a* to thereby cause the inside of the cylinder 76 to communicate with the second passage 108 via the first passage 102 (see FIG. 4). At this time, the lip 104 of the check valve 86 is pressed toward the inner peripheral wall of the third hole 92 by the pressurized fluid, thereby preventing the pressurized fluid from being introduced into the second hole 90.

As a result, the pressurized fluid does not flow into the electromagnetic valve. After the pressurized fluid has passed through the second passage 108 via the first passage 102 of the recess 100 and noise developed in the pressurized fluid has been eliminated by the silencing member 62, the pressurized fluid is discharged into the air from the fourth passages 112*a*, 112*b*.

In the second embodiment, as described above, the speed controller 80 can be disposed as a vertical type when the space for placing the speed controller 80 between the electromagnetic valve and the cylinder 76 is extremely narrow.

Figure 5:
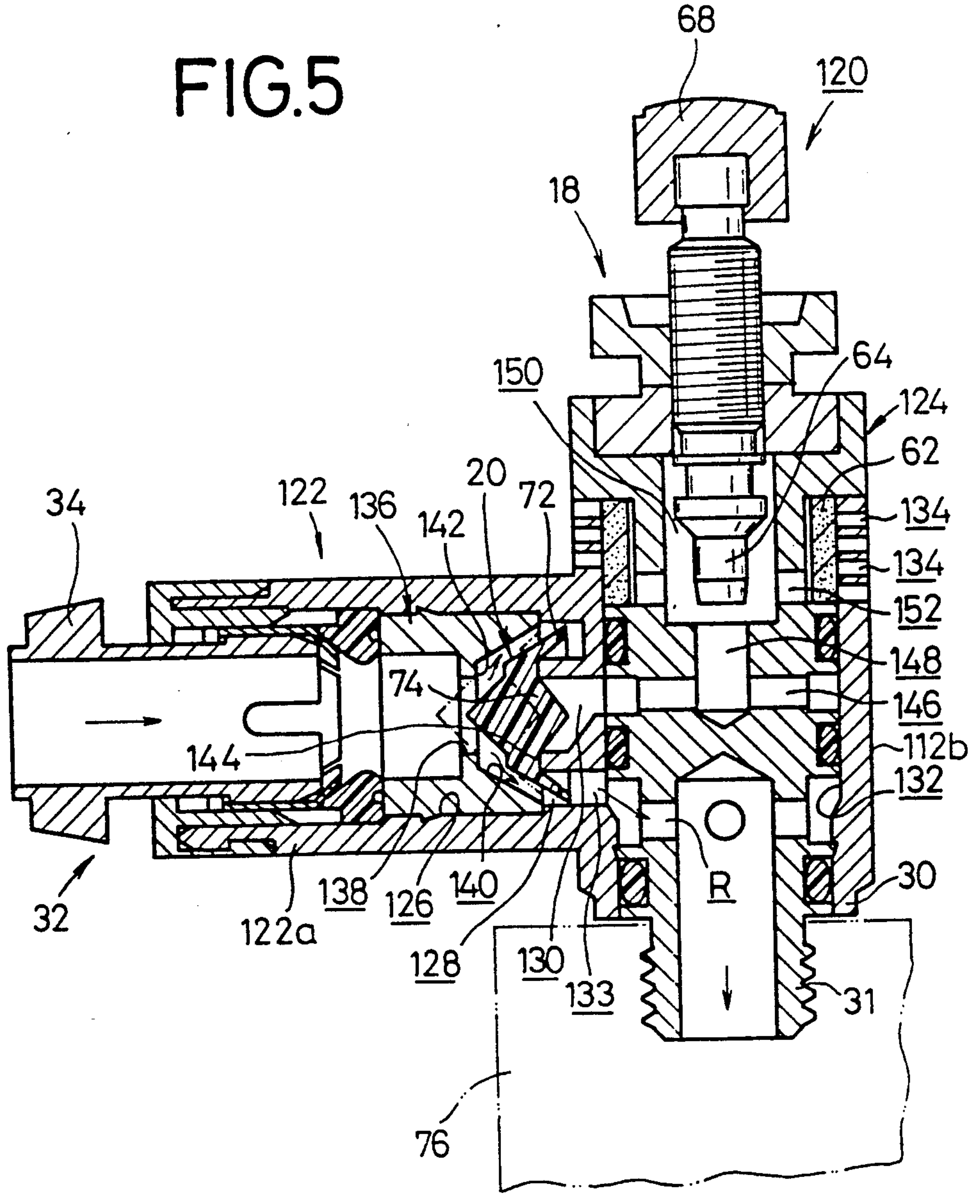
FIG. 5 is a vertical cross-sectional view showing a speed controller according to a third embodiment of the present invention.

Next, FIG. 5 shows a third embodiment of the present invention. In the third embodiment, the same elements of structure as those employed in the first embodiment are identified by like reference numerals and their detailed description will therefore be omitted.

A speed controller 120 according to the third embodiment basically comprises a pipe or line fitting 122, a cylindrical body 124 integrally fitted in the line fitting 122, a main body 18 of a needle valve, which is inserted into the cylindrical body 124, and a check valve 20 which can be displaced along the axis of the line fitting 122.

An elongated cylindrical part 122*a* of the line fitting 122 has a first hole 126 defined therein. A ring-shaped groove 128 and a second hole 130 whose diameter is small, communicate coaxially with one end of the first hole 126. The second hole 130 communicates with a third hole 132 defined in a short cylindrical part 112*b* of the line fitting 122 in such a manner that both axes are perpendicular to each other. In addition, the ring-shaped groove 128 communicates with the third hole 132 via an aperture or opening 133. A plurality of circumferentially-extending slits 134 are defined in the outer peripheral wall of one end of the cylindrical part 122*b* at given angular ranges. Accordingly, the third hole 132 can communicate with the outside via the slits 134.

A one-touch type fitting or joint 32 and a receiving member 136 are inserted into the first hole 126. The receiving member 136 has a narrow-diameter hole 138 centrally defined therein. A slanted hole 140 corresponding to the shape of the check valve 20 communicates with one end of the hole 138. A first seat portion 142 is formed in the boundary between the hole 138 and the slanted hole 140. The outer diameter of the ring-shaped groove 128 corresponds to that of the check valve 20. A second seat portion 144 is formed in the boundary between the inner end of the ring-shaped groove 128 and the second hole 130.

A pressurized-fluid introducing passage R is defined between the leading end of the cylindrical body 124 and a connecting member 31. The cylindrical body 124 has a first passage 146 defined therein, which can communicate with the second hole 130. The first passage 146 communicates with a second passage 148 defined in the cylindrical body 124 along the axis thereof, and a third passage 150 whose diameter is large communicates coaxially with one end of the second passage 148. The third passage 150 communicates with a fourth passage 152 radially defined in the cylindrical body 124. The fourth passage 152 can communicate with the outside through the slits 134. The operation of the speed controller 120 according to the third embodiment, which is constructed as described above, will now be described below.

When an unillustrated electromagnetic valve is actuated to introduce the pressurized fluid into the hole 138 of the receiving member 136 attached to the line fitting 122 from the one-touch type joint 32, the check valve 20 is moved in the right-hand direction as seen in FIG. 5 along the slanted hole 140 under the pressure of the pressurized fluid so as to be seated on the second seat portion 144. Accordingly, a main body 74 of the check valve 20 closes the second hole 130 to thereby cut off the electromagnetic valve from communicating with the main body 18. Further, the pressurized fluid serves to inwardly flex a lip 72 of the check valve 20, thereby reducing the outer diameter of the check valve 20. As a result, the hole 138 communicates with the pressurized-fluid introducing passage R through the groove 128 and the opening 133. Therefore, the pressurized fluid reaches a cylinder 76 Via the connecting member 31 to thereby displace an unillustrated piston of the cylinder 76 in a desired direction.

Next, when the pressurized fluid is discharged from the cylinder 76, the pressurized fluid reaches the lip 72 of the check valve 20 from a passage defined in the connecting member 31 so as to outwardly flex the lip 72, thereby increasing the outer diameter of the check valve 20 and displacing the check valve 20 toward the receiving member 136. Accordingly, the inside of the cylinder 76 communicates with the third passage 150 via the second hole 130, the first passage 146 and the second passage 148. At this time, the lip 72 of the check valve 20 is pressed toward the inner peripheral wall of the slanted hole 140 of the receiving member 136 so as to be tightly fitted on the first seat portion 142, thereby preventing the pressurized fluid from flowing into the hole 138 (see the two-dot chain line in FIG. 5). As a result, the pressurized fluid does not flow into the electromagnetic valve. After the pressurized fluid has flowed into the fourth passage 152 via the second hole 130, the first passage 146, the second passage 148 and the third passage 150 and noise developed in the pressurized fluid has been eliminated by a silencing member 62, the pressurized fluid is discharged into the air from the slits 134.

Figure 6:
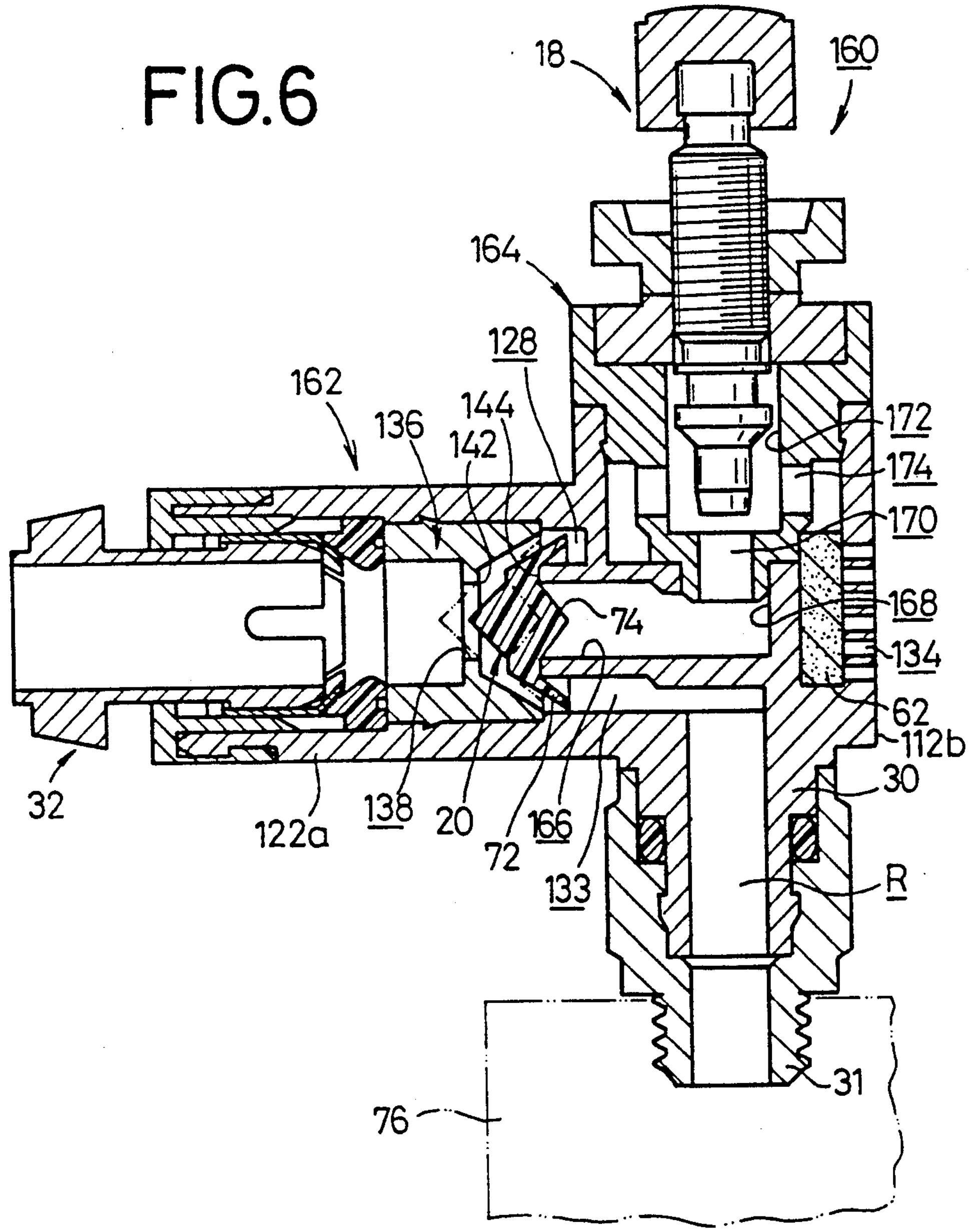
FIG. 6 is a vertical cross-sectional view illustrating a speed controller according to a fourth embodiment of the present invention.

Further, FIG. 6 shows a fourth embodiment of the present invention. In the fourth embodiment, the same elements of structure as those employed in the third embodiment are identified by like reference numerals and their detailed description will therefore be omitted.

A speed controller 160 according to the fourth embodiment basically comprises a pipe or line fitting 162, a cylindrical body 164 integrally fitted in the line fitting 162, a main body 18 of a needle valve, which is inserted into the cylindrical body 164, and a check valve 20 capable of being displaced along the axis of the line fitting 162.

A second seat portion 144 of the line fitting 162 has a first passage 166 defined therein coaxially with a cylindrical part 122a. A hole 168 communicates with one end of the first passage 166 in such a manner that both axes are perpendicular to each other. The cylindrical body 164 is fitted in the hole 168 so as to allow a second passage 170 of the cylindrical body 164 to communicate with the first passage 166. In addition, a third passage 172, which is large in diameter, communicates coaxially with one end of the second passage 170 and is brought into communication with the outside via a fourth passage 174 radially defined in the cylindrical body 164 and a plurality of slits 134.

The operation of the speed controller 160 according to the fourth embodiment, which is constructed as described above, is substantially identical to that of the speed controller 120 according to the third embodiment. The operation of the speed controller 160 will be summarized below.

When the pressurized fluid is introduced into the cylindrical part 122a of the line fitting 162 from a one-touch type joint 32 under the action of an unillustrated electromagnetic valve, the check valve 20 is moved in the right-hand direction by the pressurized fluid so as to be seated on the second seat portion 44. Accordingly, the first passage 166 is closed, so that the pressurized fluid flows into a cylinder 76 via a connecting member 31 so as to displace an unillustrated piston of the cylinder 76 in a desired direction.

On the other hand, when the pressurized fluid is discharged from the cylinder 76, the pressurized fluid flows into a pressurized-fluid introducing passage R from a passage defined in the connecting member 31 so as to bring the check valve 20 into engagement with a first seat portion 142, thereby causing the inside of the cylinder 76 to communicate with the first passage 66 (see the two-dot chain line in FIG. 6). Therefore, the pressurized fluid does not flow into the electromagnetic valve. After the pressurized fluid has been introduced into the fourth passage 174 from the first passage 166, the second passage 170 and the third passage 172 and noise developed in the pressurized fluid has been reduced to silence by a silencing member 2, the pressurized fluid is discharged into the air from the slits 134.

Figure 7:
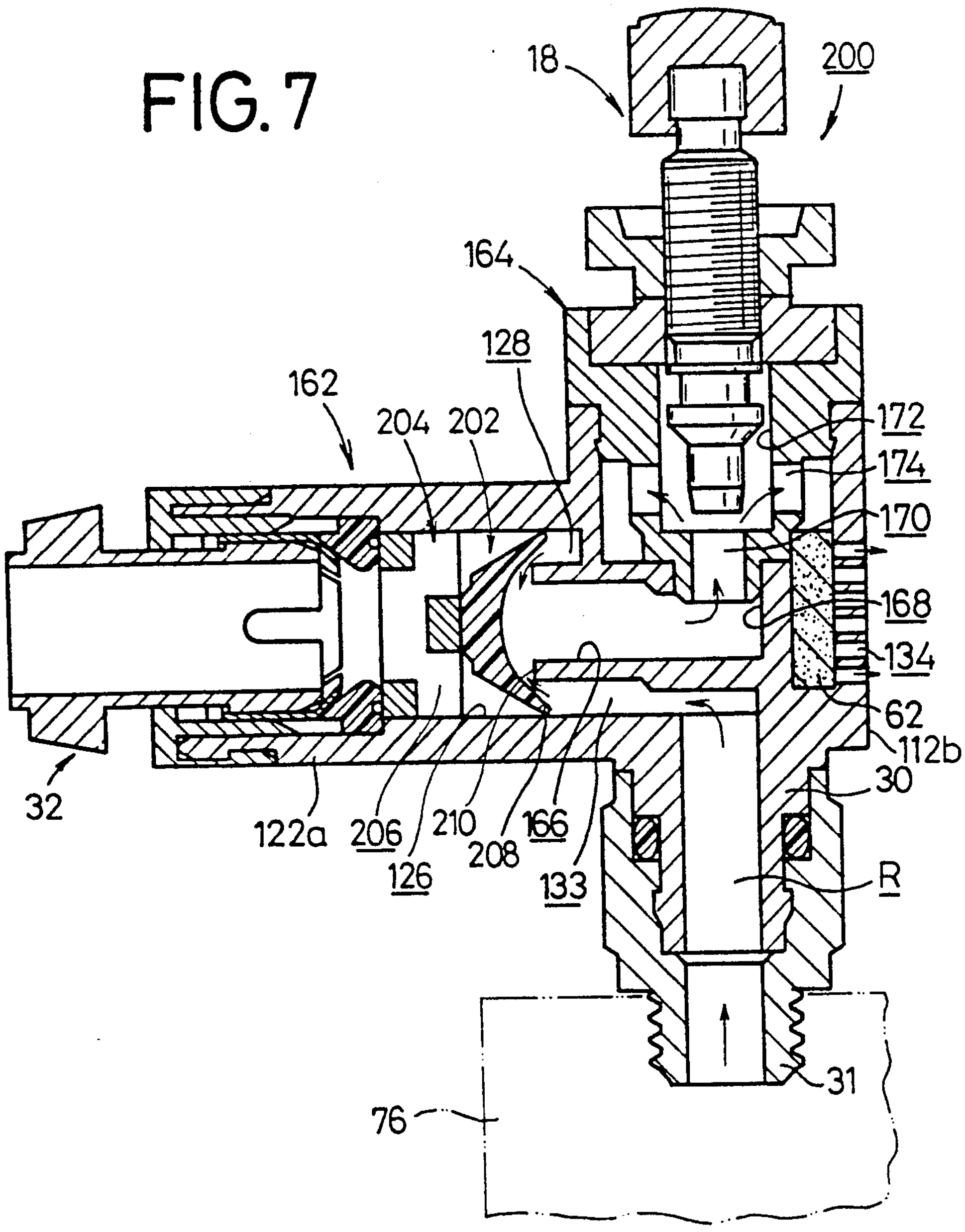
FIG. 7 is a vertical cross-sectional view showing a speed controller according to a fifth embodiment of the present invention.
Figure 8:
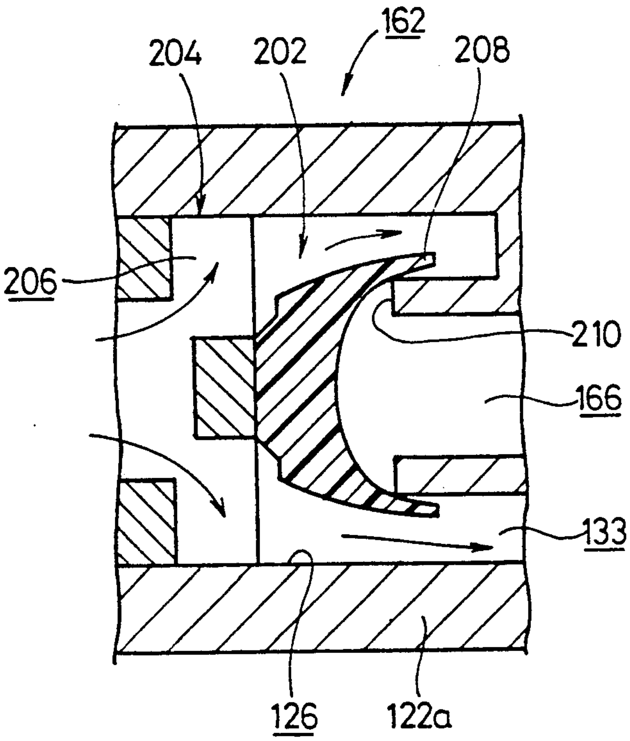
FIG. 8 is a view for describing the operation of the speed controller shown in FIG. 7.

Next, a fifth embodiment of the present invention is shown in FIGS. 7 and 8. In the fifth embodiment, the same elements of structure as those employed in the fourth embodiment are identified by like reference numerals and their detailed description will therefore be omitted.

A speed controller 200 according to the fifth embodiment is different from that according to each of the first through fourth embodiments and is provided with a fixed check valve 202. A fixed member 204 is formed onto an inner wall of a cylindrical part 122a of a tube or line fitting 162. The outer peripheral edge of the fixed member 204 is cut away each cut being for a predetermined angular neuron to define a passage 206 between the inner wall surface of the cylindrical part 122a and the central portion of the fixed member 204. The check valve 202 is fixed to one end of the fixed member 204 or formed integrally with the fixed member 204. A lip 208 of the check valve 202 can be brought into engagement with an inner wall surface of a first hole 126 and or a seat portion 210.

The operation of the speed controller 200 according to the fifth embodiment, which is constructed as described above, will be summarized below. An unillustrated electromagnetic valve is first actuated to introduce the pressurized fluid into the cylindrical part 122a of the line fitting 162 from a one-touch type joint 32. The lip 208 of the check valve 202 is flexed inwardly by the pressurized fluid so as to reduce the outer diameter of the check valve 202. As a result, the lip 208 is seated on the seat portion 210 (see FIG. 8). Thus, a first passage 166 is closed to the pressurized fluid the pressurized fluid flows into a cylinder 76 from the passage 206 via the connecting member 31, thereby moving an unillustrated piston of the cylinder 76 in a desired direction.

On the other hand, when the pressurized fluid is discharged from the cylinder 76, the pressurized fluid flows into a pressurized-fluid introducing passage R from a passage defined in the connecting member 31. Thus, the lip 208 of the check valve 202 is flexed outwardly so as to increase the outer diameter of the check valve 202. Therefore, the lip 208 is separated from the seat portion 210 so as to abut against the inner wall surface of the cylindrical part 122a, thereby allowing the inside of the cylinder 76 to communicate with the first passage 166 (see FIG. 7). Accordingly, the pressurized fluid does not flow into the electromagnetic valve. After the pressurized fluid has flowed into a fourth passage 174 via the first passage 166, a second passage 170 and a third passage 172, and noise developed in the pressurized fluid has been reduced to silence by a silencing member 62, the pressurized fluid is discharged into the air from a plurality of slits 134.

As described above, the fifth embodiment can bring about the same operations and effects as those obtained by other embodiments each using the movable check valve 20 or the like even if the fixed check valve 202 is used.

The speed controller of the present invention can bring about the following advantageous effects.

When a pressurized fluid is introduced from a first connecting portion, a check valve is tightly fitted on a seat portion so as to close a passage of a main body. On the other hand, when the pressurized fluid is introduced from a second connecting portion, the check valve is spaced away from the seat portion so as to cause the pressurized fluid to flow into a needle valve mechanism from the passage, thereby discharging the pressurized fluid from the speed controller. It is therefore possible to prevent water vapor from adhering to a pressurized-fluid introducing passage used to allow an electromagnetic valve to communicate with a cylinder. In addition, the response time of the cylinder can be reduced as a whole and the degree of freedom of arrangement of devices can be improved.

Having now fully described the invention, it will be apparent to those skilled in the art that many changes and modifications can be made without departing from the spirit or scope of the invention as set forth herein.

What is claimed is:

1. A speed controller for regulating the introduction of pressurized fluid into an external device and the discharge therefrom, comprising: a main body having:

(a) a first connecting portion for receiving the fluid;

(b) a second connecting portion for passing the fluid from said first connecting portion to the external device, and for receiving the fluid flowing back from the external device;

(c) a discharge portion for discharging from said main body, the fluid flowing back from the external device through said second connecting portion, wherein said discharge portion having an exit port, wherein the respective axes of said first and second portions and said discharge portion lie on the same plane;

(d) a fluid flow regulating valve, disposed within said discharge portion, for regulating the rate of fluid discharge from said discharge portion by means of selective adjustment of the effective cross-sectional area of said discharge portion exit port;

(e) a passageway disposed intermediate said first and second connecting portions and said discharge portion, for providing intermittent fluid communication among said portions; and (f) check valve means, housed in said passageway and having a check valve with:

a front section, facing the fluid flowing from said first connecting portion, and a rear section, facing the fluid flowing from said second connecting portion, a lip disposed at the peripheral portions of said check valve front and rear sections, which is flexibly engageable with the inner wall of said passageway in a fluid-tight sealing relationship in a forward position, and flexibly disengageable therefrom in a backward position, so that in the backward position said rear section is moved, in response to the flow of fluid flowing from said first connecting portion against said check valve, (i) to engage and seal said discharge portion relative to said first and second connecting portions, and (ii) to permit the flow of fluid past said check valve, through said passageway to said second connecting portion and external device is sequence, and so that, in the forward position: said rear section lip is flexed outwardly in response to the flow of fluid thereagainst flowing back from said discharge portion through said second connecting portion, (i) to disengage said rear section from said discharge portion and thereby unseal said discharge portion to permit the flow of fluid flowing back from the external device to said discharge portion, and also (ii) to engage said lip with an adjacent portion of said passageway inner wall and thereby seal said first connecting portion relative to said second connecting portion and said passageway.

2. A speed controller as recited in claim 1, wherein said check valve is displaceable in said passageway in response to the flow of fluid thereagainst, and in said backward position the movement of said check valve rear section is affected by the displacement of said check valve to seal said discharge portion.

3. A speed controller as recited in claim 1, wherein said check valve is displaceable in said passageway in response to the flow of fluid thereagainst, and in said forward position said check valve front section is displaced to engage and seal said first connecting portion relative to said passageway and said second connecting portion.

4. A speed controller as recited in claim 2, wherein said check valve is displaceable in said passageway in response to the flow of fluid thereagainst, and in said forward position said check valve front section is displaced to engage and seal said first connecting portion relative to said passageway and said second connecting portion.

5. A speed controller as recited in claim 1, wherein in said backward position, the movement of said check valve rear section is effected by the flexing inwardly of said lip to seal said discharge portion.

6. A speed controller as recited in claim 2, wherein said check valve front section is substantially cone-shaped and pointed into the flow of fluid flowing from said first connecting portion, and said first connecting portion has a section proximate said check valve front section which is profiled to engage said check valve front section in a fluid-tight relationship in said backward position.

7. A speed controller as recited in claim 3, wherein said check valve front section is substantially cone-shaped and pointed int the flow of fluid flowing from said first connecting portion, and said first connecting portion has a section proximate said check valve front section which is profiled to engage said check valve front section in a fluid-tight relationship in said backward position.

8. A speed controller is recited in claim 4, wherein said check valve front section is substantially cone-shaped and pointed into the flow of fluid flowing from said first connecting portion, and said first connecting portion has a section proximate said check valve front section in a fluid-tight relationship in said backward position.

9. A controller as recited in claim 6, wherein said check valve back section is substantially cone-shaped and pointed in the opposite direction as said check valve front section.

10. A controller as recited in claim 7, wherein said check valve back section is substantially cone-shaped and pointed in the opposite direction as said check valve front section.

11. A controller as recited in claim 8, wherein said check valve back section is substantially cone-shaped and pointed in the opposite direction as said check valve front section.

12. A speed controller as recited in claim 2, wherein said discharge portion has a tubular member disposed therein, said tubular member being in intermittent fluid communication with said passageway to conduct the fluid therethrough, and said tubular member has an inlet opening on the radial wall therethrough to receive the fluid from the external device and an outlet opening in fluid communication with said discharge portion exit port, and wherein said check valve is a collar-like ring, slidably and snugly displaceable about said tubular member, and is in the shape of a truncated cone pointed against the flow of fluid, wherein in said forward position, said ring covers and seals said radial opening and prevents flow of the fluid into said tubular member to thereby seal said discharge portion relative to said first connecting portion, and wherein in said backward position, said ring uncovers said radial opening to permit flow of fluid into said tubular member.

13. A speed controller as recited in claim 1, wherein said regulating valve is a needle valve.

14. A speed controller as recited in claim 2, wherein said regulating valve is a needle valve.

15. A speed controller as recited in claim 3, wherein said regulating valve is a needle valve.

16. A speed controller as recited in claim 4, wherein said regulating valve is a needle valve.

17. A speed controller as recited in claim 5, wherein said regulating valve is a needle valve.

18. A speed controller as recited in claim 6, wherein said regulating valve is a needle valve.

19. A speed controller as recited in claim 7, wherein said regulating valve is a needle valve.

20. A speed controller as recited in claim 8, wherein said regulating valve is a needle valve.

* * * * *